US012776160B2

(12) United States Patent
Dumont et al.

(10) Patent No.: US 12,776,160 B2
(45) Date of Patent: Oct. 27, 2026

(54) METHOD FOR PROCESSING AN IMAGE ACQUIRED BY A FINGERPRINT SENSOR, IN ORDER TO DISCRIMINATE BETWEEN FINGERS AND MARKS

(71) Applicant: IDEMIA PUBLIC SECURITY FRANCE, Courbevoie (FR)

(72) Inventors: Denis Dumont, Courbevoie (FR); Olivier Fournier, Courbevoie (FR); Grégoire Bezot, Courbevoie (FR)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 0 days.

(21) Appl. No.: 19/076,036

(22) Filed: Mar. 11, 2025

(65) Prior Publication Data

US 2025/0292613 A1 Sep. 18, 2025

(30) Foreign Application Priority Data

Mar. 12, 2024 (FR) .................................. FR2402465

(51) Int. Cl.
*G06V 40/12* (2022.01)
*G06V 10/25* (2022.01)
*G06V 10/26* (2022.01)
*G06V 10/75* (2022.01)

(52) U.S. Cl.
CPC .......... *G06V 40/1376* (2022.01); *G06V 10/25* (2022.01); *G06V 10/26* (2022.01); *G06V 10/751* (2022.01); *G06V 40/1359* (2022.01)

(58) Field of Classification Search
CPC ........... G06V 40/1376; G06V 40/1359; G06V 40/13; G06V 10/25; G06V 10/751; G06V 10/26
See application file for complete search history.

(56) References Cited

U.S. PATENT DOCUMENTS 9,934,421 B1 * 4/2018 Nilsson .............. G06V 40/1394
2021/0004559 A1 * 1/2021 Ding .................. G06V 40/1365
2023/0130790 A1 4/2023 Pallerla et al.

FOREIGN PATENT DOCUMENTS

CA 2960247 A1 9/2017

* cited by examiner

*Primary Examiner* — Stephen G Sherman
(74) *Attorney, Agent, or Firm* — Oblon, McClelland, Maier & Neustadt, L.L.P.

(57) ABSTRACT

A method is provided for processing an image acquired by a fingerprint sensor, in order to discriminate between fingers and marks. The method comprises determining a ridge value associated with a pixel of the image and a valley value associated with the pixel; calculating a dynamic range associated with the pixel as a ratio between a difference between the ridge value and the valley value that are associated with the pixel, and a reference value that is a linear combination of the ridge value and the valley value that are associated with the pixel; comparing the dynamic range associated with the pixel and a threshold; and generating a result associated with the pixel, said result indicating that the pixel shows a finger within sight of the fingerprint sensor only if the dynamic range is above the threshold.

12 Claims, 3 Drawing Sheets

[Fig. 1]
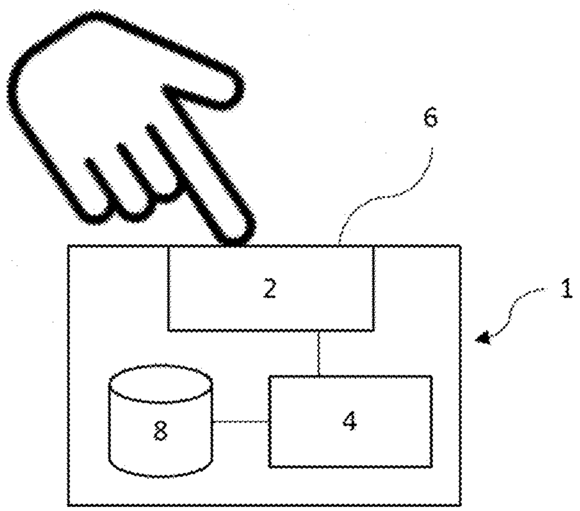
[Fig. 2]
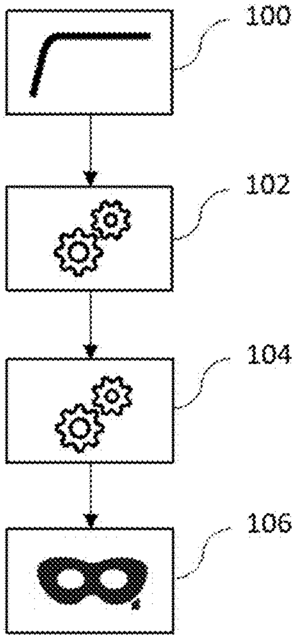

[Fig. 3]
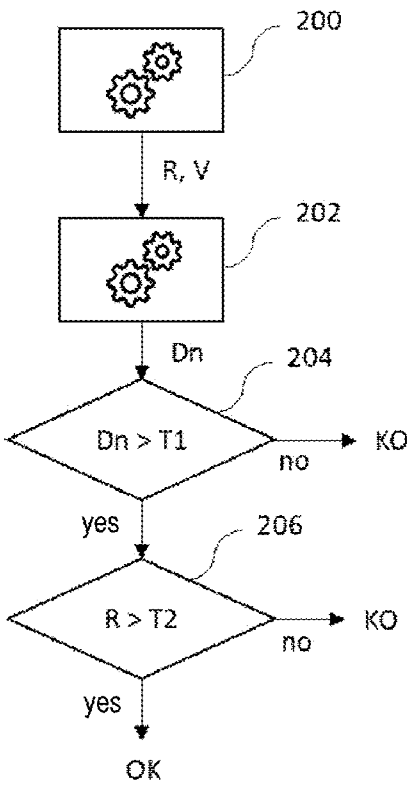
[Fig. 4]
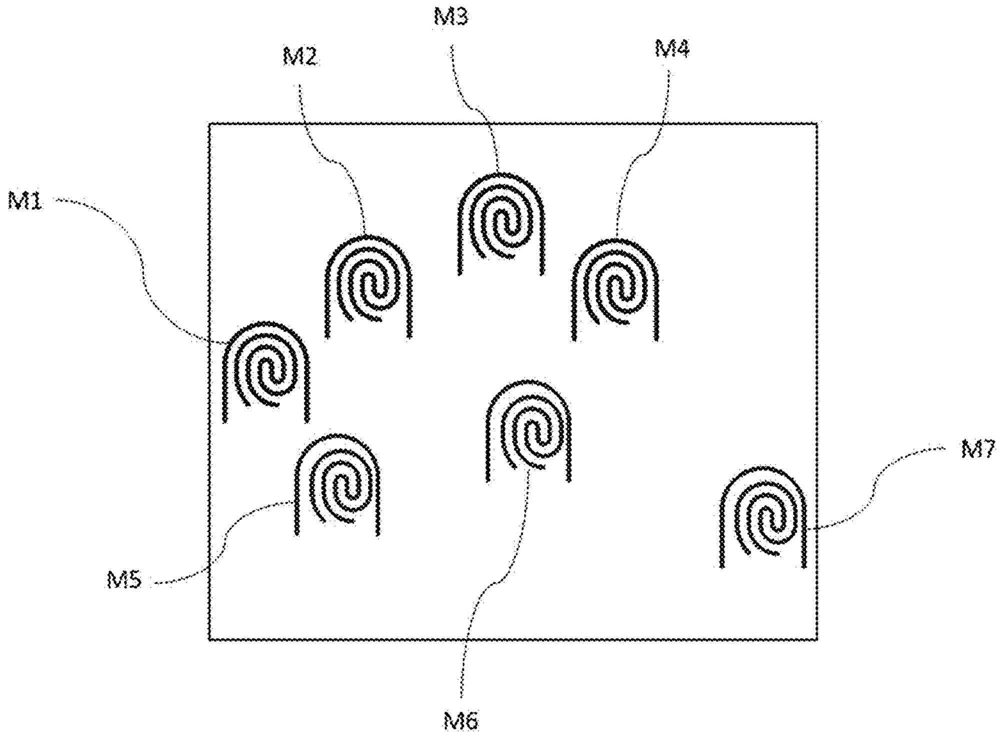

[Fig. 5]
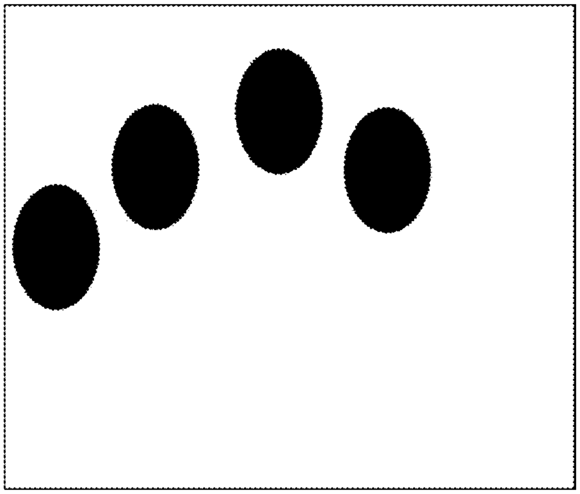

METHOD FOR PROCESSING AN IMAGE ACQUIRED BY A FINGERPRINT SENSOR, IN ORDER TO DISCRIMINATE BETWEEN FINGERS AND MARKS

TECHNICAL FIELD

The present invention relates to a method for processing an image acquired by a fingerprint sensor.

PRIOR ART

Some sensors used to acquire fingerprint images are sensitive to the following parameters: type of skin of the person (light skin, dark skin), dampness of the fingers of the person, lighting conditions for the skin (ambient light and/or internal light of the sensor used). Therefore, the prints obtained in an image acquired by such sensors are highly variable.

Furthermore, a finger placed on a surface within sight of the sensor can leave a mark after this finger is no longer within sight of the sensor. This mark is likely to have ridges and valleys in the same way as a skin pattern. Therefore, an image acquired by a sensor can show a finger within sight of the sensor, but also marks that do not correspond to a finger within sight of the sensor.

Such marks are also subject to variabilities, and can be difficult to distinguish from genuine fingerprints within sight.

SUMMARY

An aim of the invention is to perform a more precise discrimination, in an image acquired by a fingerprint sensor, between fingers within sight of the sensor and other marks.

To this end, according to a first aspect, a method for processing an image acquired by a fingerprint sensor is proposed, the method comprising the following steps implemented for at least one pixel of the image:

- determining a ridge value associated with the pixel and a valley value associated with the pixel, wherein the ridge value is a maximum pixel value of the image in a predefined vicinity of the pixel, and the valley value being a minimum pixel value of the image in a predefined vicinity of the pixel;
- calculating a normalized dynamic range associated with the pixel as a ratio between a difference between the ridge value associated with the pixel and the valley value associated with the pixel and a reference value that is a linear combination of the ridge value R associated with the pixel and the valley value V associated with the pixel;
- comparing the normalized dynamic range associated with the pixel and a dynamic range threshold; and
- generating a result associated with the pixel, the result associated with the pixel indicating that the pixel shows a finger within sight of the fingerprint sensor only if the normalized dynamic range is above the dynamic range threshold.

The method according to the first aspect can also comprise the following optional features, taken alone or in combination each time this makes technical sense.

Preferably, the reference value is proportional to the ridge value associated with the pixel or proportional to the valley value associated with the pixel.

Preferably, the method according to the first aspect moreover comprises:

- comparing the ridge value associated with the pixel or the valley value associated with the pixel with a value threshold,
- wherein the result associated with the pixel indicates that the pixel shows a fingerprint only if the following conditions are met:
- the normalized dynamic range is above the dynamic range threshold, and
- the ridge value or the valley value is above the value threshold.

Preferably, the method according to the first aspect moreover comprises:

- identifying an area of interest in the image showing a candidate object likely to be a fingerprint,
- repeating the steps of determining, calculating, comparing and generating a result for each pixel of the area of interest so as to generate a mask comprising a plurality of results that are respectively associated with the pixels of the area of interest,
- generating a consolidated result associated with the area of interest from the mask, wherein the consolidated result indicates that the candidate object is a fingerprint only if the plurality of results that are respectively associated with the pixels of the area of interest comprises a majority of results indicating pixels showing a finger within sight of the fingerprint sensor.

Preferably, the method according to the first aspect moreover comprises:

- repeating the steps of determining, calculating, comparing and generating a result for different pixels of the image so as to generate a mask comprising a plurality of results that are respectively associated with the different pixels,
- in the mask, identifying a group of results that are respectively associated with adjacent pixels of the image, the group of results indicating that the adjacent pixels associated therewith all show a finger within sight of the fingerprint sensor,
- provided that the group of results has a number of results less than a predefined number, adjusting the group of results in the mask so as to indicate that none of the adjacent pixels show a finger within sight of the fingerprint sensor.

Preferably, the method according to the first aspect moreover comprises:

- repeating the steps of determining, calculating, comparing and generating a result for different pixels of the image so as to generate a mask comprising a plurality of results that are respectively associated with the different pixels,
- in the mask, identifying a group of results that are respectively associated with adjacent pixels of the image, the group of results indicating that the adjacent pixels associated therewith all show a finger within sight of the fingerprint sensor;
- provided that the group of results has a number of results greater than a predefined number, identifying, in the mask, supplementary results that are respectively associated with supplementary pixels of the image forming an area of the image of predefined shape, for example ovoid, with the adjacent pixels;
- adjusting in the mask so that the supplementary results indicate that the supplementary pixels show a finger within sight of the fingerprint sensor.

Preferably, the fingerprint sensor is a contact-based sensor, preferably a line-of-sight contact-based sensor.

A second aspect of the present disclosure is a computer program product comprising program code instructions for carrying out the steps of the method according to the first aspect when this program is executed by an image processing module.

A third aspect of the present disclosure is a memory readable by an image processing module, storing instructions that are executable by an image processing module for carrying out the steps of the method according to the first aspect.

A fourth aspect of the present disclosure is a device comprising a fingerprint sensor and an image processing module that is configured to process an image acquired by the fingerprint sensor, using the method according to the first aspect.

DESCRIPTION OF THE FIGURES

Other features, aims and advantages of the invention will emerge from the description that follows, which is purely illustrative and not limiting, and which should be read with regard to the appended drawings, in which:

FIG. 1 schematically shows a device according to an embodiment of the invention.

FIG. 2 is a flowchart of steps of an image processing method according to an embodiment of the invention.

FIG. 3 is a flowchart detailing the substeps of a step of the method of FIG. 2, according to an embodiment.

FIG. 4 schematically shows an image involved in the implementation of the method of FIG. 2.

FIG. 5 schematically shows a detection mask generated during the implementation of the method of FIG. 2.

Throughout the figures, similar elements bear identical reference signs.

DETAILED DESCRIPTION OF THE INVENTION

Device

Referring to FIG. 1, a device 1 comprises a fingerprint sensor 2 and an image processing module 4.

The function of the fingerprint sensor 2, more simply called sensor 2 hereinbelow, is to generate an image showing a fingerprint of the finger of a user of the device 1 when the user places this finger in a predefined acquisition area within sight of the sensor 2. The sensor 2 generates the image from the light that it receives. One part of this light has been returned by the ridges of the fingerprint, and another part of the light that it receives has been returned by the valleys of the fingerprint.

The sensor 2 is a contact-based sensor 2, for example, which supposes that the device 1 comprises an acquisition surface 6 onto which the finger is supposed to be placed when the sensor 2 acquires an image.

In particular, the sensor 2 may be a line-of-sight contact-based sensor 2, for example of TFT (Thin Film Transistor) type, with a glass substrate, or of CMOS (Complementary Metal Oxide Silicon) type, with a silicon substrate. Alternatively, the sensor 2 may be a sensor operating according to the principle of total reflection (frustrated total internal reflection, abbreviated to FTIR).

The function of the image processing module 4, more simply called module 4 hereinbelow, is to process an image acquired by the sensor 2.

The module 4 is for example a dedicated physical component, such as a circuit, for example a programmable circuit (FPGA) or a non-programmable circuit (ASIC). As a variant, the device 1 comprises a processor, and the module 4 is a software component, in other words a computer program comprising code instructions intended to be executed by the processor. The processor can comprise one or more cores (for executing tasks simultaneously).

The device 1 furthermore comprises a memory 8 fit to store the program, images acquired by the sensor 2, or data produced by the module 4. The memory typically comprises a nonvolatile memory, in which the program is stored, and a volatile memory, into which the program can be loaded and for temporarily storing data calculated by the module 4.

Image Processing Method

A method implemented by the image processing module 4 will now be explained in detail hereinbelow with reference to FIG. 2.

In a preliminary step, an image has been acquired by the sensor 2 and then transmitted to the image processing module 4.

The image acquired by the sensor 2 is likely to comprise one or more patterns having ridges and valleys. A distinction is made between two types of patterns hereinbelow:

- patterns showing skin patterns of fingers that were within sight of the sensor 2 when the image was acquired, and that will conventionally be called “fingerprints”;
- patterns containing valleys and ridges that do not relate to fingers within sight of the sensor 2 when the image was acquired. By convention, these patterns will be called “marks” hereinbelow, in order to distinguish these patterns from the fingerprints. Typically, such marks may have been left on a surface of the device 1 by a finger. In this case, there is, on the surface, a deposit of (for example greasy) material that comes from a finger, but this finger is no longer within sight of the sensor 2: it is this deposited material that is seen by the sensor 2, and that could be confused with a genuine fingerprint, in spite of the fact that there is no finger within sight of the sensor 2.

In a preprocessing step 100, the module 4 identifies at least one area of interest in the image, each area of interest showing a candidate pattern having ridges and valleys. At this stage, the term “candidate” pattern is used because the module 4 does not yet know whether a pattern containing ridges and valleys is a fingerprint (which therefore relates to a finger within sight of the sensor 2) or a mark (which does not relate to a finger within sight of the sensor 2).

This identification can typically be performed by segmenting the image according to a spatial frequency criterion or a level criterion. During this segmentation, at least one low-frequency area of the image is considered to be a background of the image that does not constitute an area of interest, and at least one high-frequency area of the image is considered to be an area of interest. This is because a pattern containing ridges and valleys is a pattern containing high spatial frequencies.

In a step 102, the module generates a fingerprint detection mask associated with the image.

Referring to FIG. 3, step 102 comprises the following substeps applied to a pixel of the image acquired by the sensor 2, this pixel being in an area of interest identified in the preprocessing step 100.

In a step 200, the module 4 determines a ridge value R associated with the pixel and a valley value V associated with the pixel.

The ridge value R is a maximum pixel value of the image in a first predefined vicinity of the pixel. The maximum-value pixel is the pixel that has received the most light among the pixels in the first vicinity. The ridge value R is indicative of a quantity of light received by the sensor 2 at the pixel after having been returned by ridges shown in the image.

Furthermore, the valley value V is associated with the pixel, the valley value V being a minimum pixel value of the image in a second predefined vicinity of the pixel. The minimum-value pixel is the pixel that has received the least light among the pixels in the second vicinity. The valley value V is indicative of a quantity of light received by the sensor 2 at this pixel after having been returned by valleys shown in the image.

The first vicinity or the second vicinity is typically a set of related pixels forming a rectangle or a square, for example centred on the pixel under consideration. Preferably, the first vicinity or the second vicinity has a height or a width, in terms of the number of pixels, that corresponds to three times the average inter-ridge distance of an adult human finger. This dimension is adjusted taking into account the resolution of the sensor 2.

The first vicinity and the second vicinity may be identical or different.

In a step 202, the module 4 calculates a normalized dynamic range Dn associated with the pixel as a ratio between:

- a dynamic range D associated with the pixel, constituting a difference between the ridge value R associated with the pixel and the valley value V associated with the pixel, and
- a reference value associated with the pixel, the reference value associated with the pixel being a linear combination of the ridge value R associated with the pixel and the valley value V associated with the pixel.

The normalized dynamic range Dn associated with the pixel thus has the following general form:

$$Dn = \frac{D}{\alpha R + \beta V} = \frac{R - V}{\alpha R + \beta V}$$

It should be noted that the reference value associated with the pixel may be proportional to the valley value V associated with the pixel or to the ridge value R associated with the pixel. In this case, one of the weights $\alpha$ or $\beta$ is zero.

In particular embodiments, the reference value associated with the pixel is the valley value V associated with the pixel or is the ridge value R associated with the pixel (which implies that one of the two weights $\alpha$ or $\beta$ is zero, while the other weight is equal to 1).

In a step 204, the module 4 compares the normalized dynamic range with a predefined dynamic range threshold T1 (the predefined dynamic range threshold T1 is stored in the memory 8 beforehand).

The module 4 then generates a result associated with the pixel, which is likely to take two values:

- a first value OK (also called "positive result" hereinbelow) indicating that the pixel shows a finger within sight of the sensor 2 (in other words, the module 4 considers the candidate pattern in the area of interest including the pixel to be a fingerprint); or
- a second value KO (also called "negative result" hereinbelow) indicating that the pixel does not show a finger within sight of the sensor 2 (in other words, the module 4 considers the candidate pattern in the area of interest including the pixel to be a simple mark on a surface of the device within sight of the sensor 2).

The result associated with the pixel may thus be a Boolean. For example, OK=1 and KO=0.

The value taken by the result depends on the comparison in step 204. Generally, the result generated by the module 4 is positive only if Dn>T1. Thus, this condition Dn>T1 is necessary for the result to be positive (OK). If this condition is not fulfilled, the result generated by the module 4 is negative.

In a simple implementation embodiment, this condition is sufficient: thus, the module 4 relies only on this condition to generate a positive result.

In a particularly advantageous embodiment, this condition relying on the normalized dynamic range Dn is not sufficient: an additional condition needs to be fulfilled for the positive result to be generated, this additional condition relying on the ridge value R or the valley value V associated with the pixel.

Thus, in an optional step 206, the module 4 can compare the ridge value R with a ridge threshold and/or can compare the valley value V with a valley threshold. The positive result OK can then be generated only if the following two conditions are met: Dn>T1 and R>T2. If these two conditions are not met, the module 4 generates the negative result KO.

It will be seen hereinbelow that the supplementary test improves the reliability of the results generated by the module 4 (reduction of false alarm and missed finger detection rates).

Steps 200 to 206 are repeated for each pixel of the image included in an area of interest. Preferably, these steps are not applied to the other pixels of the image.

Steps 204 and 206 can be performed in any order.

As a result of this repetition, the module 4 obtains a plurality of results that are respectively associated with the pixels of the image that are in the area or areas of interest in the image. This plurality of results constitutes the fingerprint detection mask in the image, resulting from step 102. This mask provides pixel-by-pixel information, which is advantageous in itself and allows the mask to be used in a later processing for authenticating or identifying an individual whose finger has been imaged.

Returning to FIG. 2, the module implements the consolidation step 104 for the detection mask, so as to obtain a consolidated mask. The consolidation step 104 can comprise the following substeps.

The module 4 identifies a group of positive results in the mask that are respectively associated with adjacent pixels of the image. In reality, the module 4 can divide all the positive results obtained into one or more groups of adjacent pixels in this substep. The module 4 then compares the number of positive results in a given group with a first predefined number.

If the number of positive results in the group is less than the first predefined number, the module 4 adjusts the mask so that the results in the group become negative in the consolidated mask. Otherwise (that is to say if the number of results in the group is not less than the first predefined number), this adjustment is not implemented.

This first adjustment of the mask allows areas of interest that are too small to be usable in later applications such as an authentication or an identification, and therefore constitute noise, to be eliminated from the consolidated mask. In particular, traces of dust on the sensor 2 can be eliminated by way of this adjustment.

Furthermore, the module 4 compares the number of results in a given group with a second predefined number. If the number of results in the group is greater than the second predefined number, the module 4 identifies supplementary results in the mask that are respectively associated with supplementary pixels of the image, these supplementary pixels forming an area of the image having a predefined shape with the adjacent pixels of the group under consideration. The module 4 then adjusts the mask so that the supplementary results are positive in the consolidated mask. This involves any supplementary result that was negative in the mask becoming positive in the consolidated mask.

This second adjustment allows a fingerprint for which only some of the pixels will have been identified in the starting mask to be "retrieved".

Preferably, this predefined shape is an ovoid shape. This shape is advantageous because it is a shape that correctly approximates the shape of a conventional fingerprint.

A third adjustment likely to be performed in step 104 involves assigning a positive overall result OK to an area of interest that has been determined in step 100 only if the majority of the pixels of the area of interest are associated with respective positive results OK. Thus, in the event of such a majority, the negative results KO in the area of interest under consideration become positive results.

The three adjustments proposed hereinabove can be selectively implemented in the consolidation step 104, and can be combined. If they are combined, the second predefined number will be greater than or equal to the first predefined number.

Of course, every adjustment can be applied to every identified group of results or to every identified area of interest.

The consolidated mask thus results from every adjustment made to the detection mask that the module 4 had obtained at the end of step 102.

By way of example, an image acquired by the sensor 2 has been shown schematically in FIG. 4. This image comprises seven areas of interest showing seven respective candidate patterns M1 to M7: fingerprints M1, M2, M3 and M4 and marks M5, M6 and M7. FIG. 5 is a representation of a consolidated mask obtained at the end of step 104, applied to the image of FIG. 4. The white parts of this mask are those that have a KO result, and the black parts are those that have an OK result. We see that the three marks M5, M6 and M7 have been eliminated, and that the four groups of pixels forming the black parts are ovoid in shape.

In a masking step 106, the module applies the consolidated mask to the image so as to obtain an output image. This application involves, for example, preserving any pixel associated with an OK result in the output image, and ensuring that all other pixels of the image have values positioned at a constant value (pixels outside areas of interest and pixels associated with KO results in the consolidated mask). This constant value is an extreme value (black or white), for example.

The output image can then be used in a step of authentication or biometric identification on the basis of the image, which is known to a person skilled in the art.

Advantages and Comparative Results

An advantage afforded by the use of the normalized dynamic range Dn as a criterion for deciding whether a pixel genuinely shows a finger within sight of the sensor 2 (rather than a mark) is that this datum Dn has little or no dependence on the quantity of light that is received by a finger imaged by the sensor 2.

To understand this, let us start from the principle that the ridge value R and the valley value V that are associated with a given pixel are proportional to the quantity of light received by a finger (this light combining the light emanating from an internal illumination source of the device 1 and a surrounding light coming from outside the device 1), which is true for any sensor 2 with a photon-to-electron conversion element that has a linear response, whether involving total reflection or line of sight. It can then be assumed that parameters k1 and k2 exist such as:

$$R = k1 \cdot L$$

$$V = k2 \cdot L$$

Injecting these terms into the formula providing the normalized dynamic range gives:

$$Dn = \frac{R - V}{\alpha R + \beta V} = \frac{k1L - k2L}{\alpha k1L + \beta k2L} = \frac{k1 - k2}{\alpha k1 + \beta k2}$$

It can be seen that the term Dn no longer depends on L.

When all is said and done, the normalized dynamic range Dn is a criterion that varies according to skins (parameters k1 and k2) but that in theory does not vary with the light from the finger L. Rather, k1 characterizes the ability of the finger to return light, or, broadly speaking, its colour, and k2 characterizes the ability of the finger to couple well to the surface of the sensor 2 (dry or damp finger). This is why the finger/mark discrimination performed by the module 4 using the normalized dynamic range Dn is much more effective than a finger/mark discrimination that would rely on the dynamic range D (which is not normalized, and depends on L).

The table hereinbelow illustrates this performance benefit, in an application of the method described previously to a device comprising a line-of-sight sensor.

TABLE 1

| Case | Pattern | Genuine finger? | R | D | Dn |
|---|---|---|---|---|---|
| 1 | Dark mark under fingers | No | 40 | 24.5 | 0.613 |
| 2 | Dark finger #1 | Yes | 75 | 27.5 | 0.367 |
| 3 | Nominal finger | Yes | 180 | 60 | 0.333 |
| 4 | Very dark finger #2 | Yes | 70 | 20 | 0.286 |
| 5 | Very dark finger #3 | Yes | 60 | 13 | 0.217 |
| 6 | Mark lit by a light emanating from a source internal to the device 1 (lighter room) | No | 35 | 6 | 0.171 |
| 7 | Dry but bright finger | Yes | 180 | 30 | 0.167 |
| 8 | Extremely dark finger (Real finger with black marker above) | Yes | 50 | 8 | 0.160 |
| 9 | DRY and dark finger #4 | Yes | 70 | 10 | 0.143 |
| 10 | Mark + light emanating from the internal source, brighter background | No | 73 | 7 | 0.096 |
| 11 | Heavy and bright mark | No | 200 | 17 | 0.085 |
| 12 | Mark lit by the light emanating from the internal source (dark room) | No | 63 | 5 | 0.079 |
| 13 | Mark lit by the outside | No | 240 | 16 | 0.067 |
| 14 | Mark without light emanating from a source internal to the device 1 | No | 160 | 5 | 0.031 |

The first column lists various candidate patterns appearing in images acquired by a sensor 2, and indicates any particular conditions under which these images have been acquired.

We see that the dynamic range D (fourth column) varies greatly, in any case much more than the normalized dynamic range Dn (fifth column). Indeed, by choosing T1=0.1 here, only two discrimination errors are made between finger and mark (in cases 1 and 6).

This dynamic range D combines particularly well with the ridge value R in a two-condition embodiment in which it is necessary to have Dn>T1 and R>T2 in order to generate a positive result. Indeed, by choosing T1=0.1 and T2=80 here, no further discrimination error is made between finger and mark.

Other Embodiments

In the embodiment shown in FIG. 3, the supplementary test performed in step 206 calls on the ridge value R. In other embodiments, there may be provision to generate the OK position result for a pixel when:

Dn>T1 and V>T3 (2 conditions to meet), or

Dn>T1 and R>T2 and V>T3 (3 conditions to meet).

In another embodiment, step 206 is not implemented.

It should also be remembered that steps 100 and 104, although advantageous, remain optional. In particular, it is possible to repeat the steps of FIG. 3 for each pixel of the image.

The method can advantageously be used with line-of-sight sensors, but is not limited to this application.

The invention claimed is:

1. A method for processing an image acquired by a fingerprint sensor, the method comprising the following steps implemented for at least one pixel of the image:

determining a ridge value associated with the pixel and a valley value associated with the pixel, wherein:

the ridge value is a maximum pixel value of the image in a predefined vicinity of the pixel; and the valley value being a minimum pixel value of the image in a predefined vicinity of the pixel;

calculating a normalized dynamic range associated with the pixel as a ratio between:

a difference between the ridge value associated with the pixel and the valley value associated with the pixel, and a reference value that is associated with one of the ridge value associated with the pixel or the valley value associated with the pixel;

comparing the normalized dynamic range associated with the pixel and a dynamic range threshold; and generating a result associated with the pixel, the result associated with the pixel indicating that the pixel shows a finger within sight of the fingerprint sensor only if the normalized dynamic range is above the dynamic range threshold.

2. The method according to claim 1, wherein the reference value is proportional to the ridge value associated with the pixel or proportional to the valley value associated with the pixel.

3. The method according to claim 1, moreover comprising:

comparing the ridge value associated with the pixel or the valley value associated with the pixel with a value threshold, wherein the result associated with the pixel indicates that the pixel shows a fingerprint only if the following conditions are met:

the normalized dynamic range is above the dynamic range threshold, and the ridge value or the valley value is above the value threshold.

4. The method according to claim 1, comprising:

identifying an area of interest in the image showing a candidate object likely to be a fingerprint, repeating the steps of determining, calculating comparing and generating a result for each pixel of the area of interest so as to generate a mask comprising a plurality of results that are respectively associated with the pixels of the area of interest, generating a consolidated result associated with the area of interest from the mask, wherein the consolidated result indicates that the candidate object is a fingerprint only if the plurality of results that are respectively associated with the pixels of the area of interest comprises a majority of results indicating pixels showing a finger within sight of the fingerprint sensor.

5. The method according to claim 1, repeating the steps of determining, calculating, comparing and generating a result for different pixels of the image so as to generate a mask comprising a plurality of results that are respectively associated with the different pixels, in the mask, identifying a group of results that are respectively associated with adjacent pixels of the image, the group of results indicating that the adjacent pixels associated therewith all show a finger within sight of the fingerprint sensor, provided that the group of results has a number of results less than a predefined number, adjusting the group of results in the mask so as to indicate that none of the adjacent pixels show a finger within sight of the fingerprint sensor.

6. The method according to claim 1, comprising:

repeating the steps of determining, calculating, comparing and generating a result for different pixels of the image so as to generate a mask comprising a plurality of results that are respectively associated with the different pixels, in the mask, identifying a group of results that are respectively associated with adjacent pixels of the image, the group of results indicating that the adjacent pixels associated therewith all show a finger within sight of the fingerprint sensor;

provided that the group of results has a number of results greater than a predefined number, identifying, in the mask, supplementary results that are respectively associated with supplementary pixels of the image forming an area of the image of predefined shape, for example ovoid, with the adjacent pixels;

adjusting in the mask so that the supplementary results indicate that the supplementary pixels show a finger within sight of the fingerprint sensor.

7. The method according to claim 1, wherein the fingerprint sensor is a line-of-sight contact-based sensor.

8. A non-transitory computer program product comprising program code instructions for carrying out the steps of the method according to claim 1 when this program is executed by a processor.

9. A device comprising:

a fingerprint sensor, a processor that is configured to process an image acquired by the fingerprint sensor, by determining a ridge value associated with the pixel and a valley value associated with the pixel, wherein:

the ridge value is a maximum pixel value of the image in a predefined vicinity of the pixel;

the valley value being a minimum pixel value of the image in a predefined vicinity of the pixel;

calculating a normalized dynamic range associated with the pixel as a ratio between:

a difference between the ridge value associated with the pixel and the valley value associated with the pixel, and a reference value that associated with one of the ridge value associated with the pixel or the valley value associated with the pixel;

comparing the normalized dynamic range associated with the pixel and a dynamic range threshold; and generating a result associated with the pixel, the result associated with the pixel indicating that the pixel shows a finger within sight of the fingerprint sensor only if the normalized dynamic range is above the dynamic range threshold.

10. The device according to claim 9, wherein the fingerprint sensor is a line-of-sight contact-based sensor which is the only sensor included in the device.

11. The device according to claim 10, wherein the line-of-side contact based sensor is (i) of Thin Film Transistor (TFT) type, with a glass substrate, or (ii) of Complementary Metal Oxide Silicon (CMOS) type, with a silicon substrate.

12. The device according to claim 10, wherein the line-of-sight contact-based sensor operates according the principle of frustrated total internal reflection (FTIR).

* * * * *